(12) United States Patent
Oh et al.

(10) Patent No.: US 10,944,135 B2
(45) Date of Patent: Mar. 9, 2021

(54) BATTERY MODULE INCLUDING COOLING/BUFFERING MEMBER HAVING POROUS STRUCTURE

(71) Applicant: LG Chem, Ltd., Seoul (KR)

(72) Inventors: Sei Woon Oh, Daejeon (KR); Soo Youl Kim, Daejeon (KR); Hyun Min Kim, Daejeon (KR); Jung Ah Shim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 82 days.

(21) Appl. No.: 15/759,427

(22) PCT Filed: Apr. 10, 2017

(86) PCT No.: PCT/KR2017/003848
§ 371 (c)(1),
(2) Date: Mar. 12, 2018

(87) PCT Pub. No.: WO2017/213344
PCT Pub. Date: Dec. 14, 2017

(65) Prior Publication Data
US 2018/0261895 A1    Sep. 13, 2018

(30) Foreign Application Priority Data

Jun. 9, 2016 (KR) .......................... 10-2016-0071475

(51) Int. Cl.
*H01M 10/00* (2006.01)
*H01M 10/613* (2014.01)
(Continued)

(52) U.S. Cl.
CPC ....... *H01M 10/613* (2015.04); *H01M 2/1016* (2013.01); *H01M 2/1077* (2013.01);
(Continued)

(58) Field of Classification Search
CPC ............. H01M 10/613; H01M 10/625; H01M 10/6554; H01M 2/1077; H01M 2/1094;
(Continued)

(56) References Cited

U.S. PATENT DOCUMENTS 8,835,036 B2    9/2014 Sohn
2010/0273041 A1   10/2010 Lawall et al.
(Continued)

FOREIGN PATENT DOCUMENTS

CN    102916142 A    2/2013
CN    105374964 A    3/2016
(Continued)

OTHER PUBLICATIONS

Machine translation of JP 2014-093239, obtained Oct. 2, 2019 (Year: 2014).*

(Continued)

*Primary Examiner* — Nicholas P D'Aniello
(74) *Attorney, Agent, or Firm* — Morgan, Lewis & Bockius LLP

(57) ABSTRACT

The present invention provides a battery module including: a battery cell laminate in which a plurality of battery cells having a structure in which an electrode assembly is inside a sealed battery case with an electrolyte solution are arranged with the sides being in contact with each other; and a cooling/buffering member, mounted beneath the battery cell laminate to support a load of the battery cell laminate, and formed of a porous structure to emit heat generated from the battery cell laminate during a charge and discharge process down the battery cell laminate.

7 Claims, 6 Drawing Sheets

(51) Int. Cl.
 H01M 2/10 (2006.01)
 H01M 10/625 (2014.01)
 H01M 10/6554 (2014.01)
 H01M 10/647 (2014.01)
 H01M 10/6567 (2014.01)
 H01M 10/6556 (2014.01)

(52) U.S. Cl.
 CPC ....... H01M 2/1094 (2013.01); H01M 10/625 (2015.04); H01M 10/647 (2015.04); H01M 10/6554 (2015.04); H01M 10/6556 (2015.04); H01M 10/6567 (2015.04); *H01M 2220/20* (2013.01)

(58) Field of Classification Search
 CPC ............. H01M 10/647; H01M 2/1016; H01M 2220/20; H01M 10/6567; H01M 10/6556
 See application file for complete search history.

(56) References Cited

U.S. PATENT DOCUMENTS

| | | |
|---|---|---|
| 2012/0156541 A1 | 6/2012 | Sohn |
| 2013/0034753 A1 | 2/2013 | Tsukuda et al. |
| 2013/0071718 A1 | 3/2013 | Cho et al. |
| 2013/0164578 A1 | 6/2013 | Sweet et al. |
| 2015/0044538 A1 | 2/2015 | Katayama et al. |
| 2016/0049706 A1 | 2/2016 | Kerspe et al. |
| 2017/0244141 A1* | 8/2017 | Weicker ................ H01M 2/348 |

FOREIGN PATENT DOCUMENTS

| | | |
|---|---|---|
| CN | 205646054 U | 10/2016 |
| CN | 206022484 U | 3/2017 |
| CN | 206076443 U | 4/2017 |
| EP | 2546904 A1 | 1/2013 |
| JP | 2014093239 A | 5/2014 |
| KR | 10-2011-0003912 A | 1/2011 |
| KR | 10-2012-0086408 A | 8/2012 |
| KR | 10-2012-0116184 A | 10/2012 |
| KR | 10-2013-0031147 A | 3/2013 |
| KR | 10-2014-0074151 A | 6/2014 |
| KR | 10-2014-0145250 A | 12/2014 |
| KR | 10-2015-0042463 A | 4/2015 |
| KR | 10-2016-0016498 A | 2/2016 |

OTHER PUBLICATIONS

International Search Report for Application No. PCT/KR2017/003848, dated Jul. 14, 2017 (5 pages).

Extended European Search Report issued in corresponding European Patent Application No. 17810467.5, dated Nov. 15, 2018.

Office Action dated Jul. 3, 2020, issued in corresponding Chinese Patent Application No. 201780003151.4.

* cited by examiner

220

320

BATTERY MODULE INCLUDING COOLING/BUFFERING MEMBER HAVING POROUS STRUCTURE

TECHNICAL FIELD

The present application claims priority under 35 U.S.C. § 119 to Korean Patent Application No. 10-2016-0071475 filed in the Korean Intellectual Property Office on Jun. 9, 2016, and under 35 U.S.C. § 365 to PCT/KR2017/003848 filed on Apr. 10, 2017, the diclosures of which are incorporated herein by reference.

The present invention relates to a battery module including a cooling/buffering member having a porous structure.

BACKGROUND ART

Recently, as the technologies for mobile devices are developed, and the demand for mobile devices increases, the demand for a repeatedly charged and discharged rechargeable battery as an energy source rapidly increases, and thus, much research on the rechargeable battery which may meet various needs is carried out. In addition, the rechargeable battery draws attention also as a power source of electric vehicles (EV), hybrid electric vehicles (HEV), plug-in hybrid electric vehicles (PLUG-IN HEV) and the like which are suggested as a solution of air pollution and the like caused by existing gasoline vehicles, diesel vehicles and the like using fossil fuels.

Accordingly, an electric vehicle (EV) operated only by a battery, a hybrid electric vehicle (HEV) using a battery and an existing engine in combination, and the like were developed, and some of them have been commercially available. As the rechargeable battery as a power source of EV, HEV and the like, a nickel hydrogen metal (Ni-MH) rechargeable battery is mainly used, however, recently, studies using a lithium secondary battery having high energy density, high discharge voltage and output stability are actively proceeding, and some of the studies are in the commercially available step.

In the case that this rechargeable battery is used in a device or equipment requiring a high capacity such as an electric power storage device or a power source of cars, the rechargeable battery is used in the form of a battery cell assembly or a battery module having a structure in which a plurality of battery cells is arranged.

In general, this battery cell assembly or battery module is used as a structure to improve structural stability by a frame or cartridge wrapping the outer surfaces of the battery cells, so that performance deterioration or safety deterioration due to physical damage of the battery cells forming the battery cell assembly or battery module is prevented, under the various operating environments of the device or equipment.

In addition, in order to cool heat generated from the battery cells during the charge and discharge process, the battery cell assembly or battery module binds a cooling member to one side, and emits the heat generated from the battery cells by conducting the heat to the cooling member.

FIG. 1 schematically illustrates a vertical cross-sectional view partially representing a structure of a conventional battery module.

Referring to FIG. 1, a battery module 10 includes battery cells 11, a cartridge 12, a cell cover 13 and a cooling plate 14.

The battery cells 11 are arranged in two units with the sides being in contact with each other and bound by the cartridge 12 for having structural stability. The battery cells 11 and the cartridge 12 are formed of a structure in which they are embedded by the cell cover 13.

The cooling plate 14 is mounted under the cell cover 13.

The structure is formed so that heat generated from the battery cells 11 during the charge and discharge process is conducted along the arrow direction through the cartridge 12 and the cell cover 13 to the cooling plate 14, and a coolant flows along the surface of the cooling plate 14 to emit the heat.

However, in this structure, it is limited depending on design requirements to form and change a heat transfer path. In addition, work requirements and process time are increased in the course of binding the cartridge, cell cover and cooling plate to the battery cells.

Accordingly, there is currently a high need for technology to fundamentally solve these problems.

DISCLOSURE

Technical Problem

The present invention has been made in an effort to provide a battery module including a cooling/buffering member having a porous structure having advantages of solving the problems of the conventional arts as described above, and the technical object which has been requested from the past.

Specifically, the object of the present invention is to provide a battery module which allows a heat transfer path for emitting heat generated from a battery cell during the charge and discharge process to be easily formed and changed and minimizes members and work requirements for structural stability of the battery module and formation of a cooling structure, thereby rendering the structure of the battery module compact, and reducing manufacturing costs.

Technical Solution

An exemplary embodiment of the present invention provides a battery module, including:

a battery cell laminate in which a plurality of battery cells having a structure in which an electrode assembly is inside a sealed battery case with an electrolyte solution are arranged with the sides being in contact with each other; and a cooling/buffering member, mounted beneath the battery cell laminate to support a load of the battery cell laminate, and formed of a porous structure to emit heat generated from the battery cell laminate during a charge and discharge process down the battery cell laminate.

Accordingly, the battery module according to the present invention has a cooling/buffering member having a porous structure, mounted beneath a battery cell laminate so as to support a load of the battery cell laminate and emit heat generated from the battery cell laminate during the charge and discharge process down the battery cell laminate, thereby allowing a heat transfer path to be easily formed and changed, ensuring structural stability of the battery module, rendering the structure of the battery module compact as compared with the conventional battery module structure, and reducing manufacturing costs.

According to an exemplary embodiment of the present invention, an upper surface of the cooling/buffering member may be configured to correspond to a lower surface of the battery cell laminate. That is, the cooling/buffering member may have a shape corresponding to one surface of the battery cell laminate and be mounted on the battery cell laminate, so that the heat may be conducted from an entire lower surface area of the battery cell laminate.

As a specific example, the lower surface of the battery cell laminate and the upper surface of the cooling/buffering member on a vertical section may be formed in an interlocked (zigzag) shape.

Specifically, the cooling/buffering member may be formed of a truss structure so as to support the load of the battery cell laminate, attenuate external impact and vibrations, and form a space in which a coolant flows.

As an example of the truss structure, the cooling/buffering member may be formed of a hexahedral structure corresponding to the lower surface of the battery cell laminate, and the hexahedral structure may be formed by binding a plurality of square column structures or binding a plurality of polyhedral structures.

As another specific example, the cooling/buffering member may be formed of a structure in which a plurality of spring structures is arranged and mounted on the lower surface of the battery cell laminate, regardless of the shape of the lower surface of the battery cell laminate.

The shape of the cooling/buffering member is not limited to the above shapes, as long as the cooling/buffering member may support the battery cell laminate and form a porous structure to be filled with the coolant.

As a specific example of the cooling/buffering member, the cooling/buffering member may have a size of 3 to 30% of the height of the battery cell laminate. When the cooling/buffering member has a size less than 3% of the height of the battery cell laminate, it may not sufficiently reduce external force applied on the battery cell laminate from external impact and vibrations, and when the cooling/buffering member has a size more than 30% of the height of the battery cell laminate, it results in lowering a battery capacity relative to the volume of the battery module, and thus, a compact battery module structure may not be achieved.

The cooling/buffering member may be formed of an elastic material, so as to support the load of the battery cell laminate, and attenuate external impact or vibrations applied on the battery cell laminate.

Specifically, the cooling/buffering member may be formed of a polymer resin. The polymer resin may be a rubber or plastic material, but not limited thereto.

According to an exemplary embodiment of the present invention, an adhesive member is interposed between the battery cell laminate and the cooling/buffering member and binds them, so that binding force between the battery cell laminate and the cooling/buffering member is strengthened, and thermal conductivity is enhanced.

According to an exemplary embodiment of the present invention, hollow region formed by the porous structure of the cooling/buffering member may be filled with a liquid or solid-phase coolant. The thermal conductivity from the battery cell may be further improved by the coolant.

The coolant may be composed of a thermally conductive polymer, specifically, a polycarbonate-based resin or polyolefin-based resin, but not limited thereto.

The coolant may be hardened in a state of filling the hollow region. Under the structure in which the coolant is hardened, an additional member for continuously disposing the coolant in the cooling/buffering member may be excluded from the battery module configuration.

According to an exemplary embodiment of the present invention, the battery cell may be a pouch type battery.

Specifically, the battery cell may be formed of a structure in which an electrode assembly having a laminated structure of a positive electrode, a separator and a negative electrode is embedded in a battery case having an electrode assembly storage portion formed therein with an electrolyte solution, and a sealing surplus portion is formed by heat fusion on the external surroundings of the electrode assembly storage portion.

The electrode assembly may be formed of a folding type, a stack type, a stack/folding type, or a lamination/stack type structure.

The electrode structure of the folding type, the stack type, the stack/folding type, or the lamination/stack type is described in detail, as follows.

First, a unit cell having the folding type structure may be manufactured by disposing a separator sheet between a positive electrode and a negative electrode in the form of a sheet produced by coating a mixture including an electrode active material on each metal current collector, and performing drying and pressing, and then performing winding.

A unit cell having the stack type structure may be manufactured by interposing a separator cut into a predetermined size corresponding to a positive electrode plate and a negative electrode plate between the positive electrode plate and the negative electrode plate produced by coating an electrode mixture on each metal current collector, and then performing drying and pressing, and cutting it into a predetermined size.

A unit cell having the stack/folding type structure has a structure in which a positive electrode and a negative electrode face each other and may be manufactured by including two or more unit cells in which two or more pole plates are laminated and winding the unit cells in a non-overlapping form with one or more separation films or bending the separation films to the size of the unit cell and interposing the separation films between the unit cells.

If necessary, one or more single pole plate may be further included between optional unit cells and/or on an outer surface of the outermost unit cell, in a structure in which the positive electrode and the negative electrode face each other.

The unit cell may be an S type unit cell in which the outermost pole plates on both sides have the same electrodes, and a D type unit cell in which the outermost pole plates on both sides have opposite electrodes.

The S type unit cell may be an SC type unit cell in which the outermost pole plates on both sides are a positive electrode, or an SA type unit cell in which the outermost pole plates on both sides are a negative electrode.

A unit cell having the lamination/stack type structure may be manufactured by coating an electrode mixture on each metal current collector, and then performing drying and pressing, cutting it into a predetermined size, and then laminating a negative electrode, a separator on the negative electrode, a positive electrode, and a separator on the positive electrode, sequentially from the bottom.

As a specific example of the battery case, the battery case is formed of a resin outer layer having excellent durability, a metal layer having a barrier property, and a laminate sheet including a resin sealant layer having a heat melting property, wherein the resin sealant layer may be heat-fused to each other.

Since the resin outer layer should have excellent resistance to external environments, it needs to have tensile strength and weather resistance of at least predetermined values. In this regard, as the polymer resin of the outer resin layer, polyethylene terephthalate (PET) and stretched nylon film may be preferably used.

As the barrier metal layer, aluminum may be preferably used, so as to exert the functions of preventing inflow or leakage of foreign matters such as gas and moisture, and also of improving the strength of the battery case.

The resin sealant layer has a heat fusion property (heat adhesiveness), and low hygroscopic for suppressing penetration of an electrolyte solution, and as the resin sealant layer, a polyolefin-based resin which does not expand or erode by the electrolyte solution may be preferably use, and more preferably, cast polypropylene (CPP) may be used.

Though the type of the battery cell is not particularly limited, a lithium secondary battery such as a lithium ion battery and a lithium ion polymer battery having merits such as high energy density, discharge voltage and output stability may be used, as the specific example thereof.

In general, the lithium secondary battery includes a positive electrode, a negative electrode, a separator, and a lithium salt-containing non-aqueous electrolyte solution.

The positive electrode is manufactured by for example, coating a mixture of a positive electrode active material, a conductive material and a binder on a positive electrode current collector, and drying it, and if required, a filler may be further added to the mixture.

The positive electrode active material may include a layered compound such as lithium cobalt oxide ($LiCoO_2$) and lithium nickel oxide ($LiNiO_2$), or a compound substituted with one or more transition metals; lithium manganese oxides such as a compound of chemical formula $Li_{1+x}Mn_{2-x}O_4$ (wherein x is 0–0.33), $LiMnO_3$, $LiMn_2O_3$ and $LiMnO_2$; lithium copper oxides ($Li_2CuO_2$); vanadium oxides such as $LiV_3O_8$, $LiFe_3O_4$, $V_2O_5$, and $Cu_2V2O7$; Ni-site type lithium nickel oxides represented by chemical formula $LiNi_{1-x}MxO_2$ (wherein M=Co, Mn, Al, Cu, Fe, Mg, B or Ga, and x=0.01–0.3); lithium manganese composite oxides represented by chemical formula $LiMn_{2-x}MxO_2$ (wherein M=Co, Ni, Fe, Cr, Zn or Ta, and x=0.01–0.1) or $Li_2Mn_3MO_8$ (wherein M=Fe, Co, Ni, Cu or Zn); $LiMn_2O_4$ in which Li of the chemical formula is partially substituted with an alkaline-earth metal ion; a disulfide compound; $Fe_2(MoO_4)_3$, and the like, but not limited thereto.

The conductive material is generally added at 1 to 30 wt % based on the total weight of the mixture including the positive electrode active material. This conductive material is not limited as long as it does not case a chemical change in the battery and has conductivity, and for example, graphite such as natural graphite or artificial graphite; carbon black such as carbon black, acetylene black, ketjen black, channel black, furnace black, lamp black and summer black; conductive fiber such as carbon fiber or metal fiber; fluorinated carbon, metal powder such as aluminum and nickel powder; conductive whisky such as zinc oxide and potassium titanate; conductive metal oxides such as titanium oxide; polyphenylene derivatives may be used as the conductive material.

The binder is a component assisting in binding the active material and the conductive material, and binding to the current collector, and generally added at 1 to 30 wt % based on the total weight of the mixture including the positive electrode active material. As the example of this binder, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butyrene rubber, fluorine rubber, various copolymers, and the like may be listed.

The filler is a component suppressing expansion of the positive electrode, and optionally used. It is not particularly limited as long as it does not case a chemical change in the battery and is a fibrous material, and may include for example, olefin-based polymers such as polyethylene and polypropylene; fibrous materials such as glass fiber and carbon fiber.

The negative electrode is manufactured by coating a negative electrode active material on a negative electrode current collector, and drying it, and if necessary, the components as described above may be optionally further included.

As the negative electrode active material, for example, carbons such as hard carbon and graphite-based carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, 2 or 3 of the periodic table, or halogen; $0 < x \leq 1$; $1 \leq y \leq 3$; $1 \leq z \leq 8$); a lithium metal; a lithium alloy; a silicon-based alloy; a tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers such as polyacetylene; Li—Co—Ni-based materials, and the like may be used.

The separator and the separation film are interposed between the positive electrode and the negative electrode, and an insulating thin membrane having high ion transmission and mechanical strength is used. The separator has a pore diameter of generally 0.01-10 μm, and a thickness of generally 5-130 μm. As this separator, for example, olefin-based polymers such as chemical resistant and hydrophobic polypropylene; a sheet or non-woven fabric prepared by glass fiber, polyethylene or the like. As the electrolyte, when a solid electrolyte such as a polymer is used, the solid electrolyte may be also used as the separator.

In addition, according to another specific exemplary embodiment, for improving battery safety, the separator and/or the separation film may be an organic/inorganic composite porous safety-reinforcing separator (SRS).

The SRS is manufactured by using inorganic particles and a binder polymer as active layer components on a polyolefin-based separator substrate, and herein has a uniform pore structure formed by interstitial volume between the inorganic particles which are the active layer component, together with the pore structure contained in the separator substrate itself.

When using this organic/inorganic composite porous separator, increase in a battery thickness due to swelling in formation may be suppressed, as compared with the case using a common separator, and when using a polymer which may be gelled during impregnation in a liquid electrolyte solution as a binder polymer component, the polymer may be also used as an electrolyte simultaneously.

In addition, the organic/inorganic composite porous separator may represent an excellent adhesion characteristic by adjusting the contents of the inorganic particles and the binder polymer which are the active layer components in the separator, and thus, a battery assembly process may be easily performed.

The inorganic particles are not particularly limited as long as they are electrochemically stable. That is, the inorganic particles which may be used in the present invention are not particularly limited as long as they do not undergo an oxidation and/or reduction reaction at applied operating voltage range of the battery (e.g., 0-5 V based on Li/Li+). Particularly, when the inorganic particles having ion transfer ability are used, performance improvement may be intended by increasing ion conductivity in the electrochemical device, and thus, it is preferred that ion conductivity is as high as possible. In addition, when the inorganic particles have high density, there is a difficulty in dispersion during coating and also, a problem of weight increase in battery manufacturing occurs, and thus, it is preferred that the density is as low as possible. In addition, in the case that the inorganic particles have a high dielectric constant, they contribute to increase of a degree of dissociation of the electrolyte salt, for example, a lithium salt in the liquid electrolyte, thereby improving ion conductivity of the electrolyte solution.

The non-aqueous electrolyte solution containing a lithium salt may include a polar organic electrolyte solution and a lithium salt. As the electrolyte solution, a non-aqueous liquid electrolyte solution, an organic solid electrolyte, an inorganic solid electrolyte, and the like may be used.

As the non-aqueous liquid electrolyte solution, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxyfranc, 2-methyl tetrahydrofuran, dimethylsulfoxide, 1,3-dioxolane, formamide, dimethylformamide, dioxolane, acetonitrile, nitromethane, methyl formate, methyl acetate, phosphate triester, trimethoxy methane, dioxolane derivative, sulfolane, methyl sulfolane, 1,3-dimethyl-2-imidazolidinone, a propylene carbonate derivative, a tetrahydrofuran derivative, ether, methyl propionate, ethyl propionate and the like may be used.

As the organic solid electrolyte, for example, polymers including a polyethylene derivative, a polyethylene oxide derivative, a polypropylene oxide derivative, a phosphate ester polymer, poly agitation lysine, polyester sulfide, polyvinyl alcohol, polyvinylidene fluoride, an ionic dissociating group and the like may be used.

As the inorganic solid electrolyte, for example, nitrides, halides and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like may be used.

The lithium salt is a material which is easily dissolved in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, 4-phenyl lithium borate, imide, and the like may be used.

In addition, to the non-aqueous electrolyte solution, for improving a charge and discharge characteristic, flame retardancy and the like, for example, pyridine, triethylphosphite, triethanolamine, cyclic ether, ethylene diamine, n-glyme, triamide hexaphosphate, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, and the like may be added. If necessary, for imparting nonflammability, a halogen-containing solvent such as carbon tetrachloride and ethylene trifluoride may be further included, and for improving a storage characteristic at high temperature, carbon dioxide gas may be further included.

Another embodiment of the present invention provides a device including one or more of the battery modules.

The device may be selected from the group consisting of a mobile phone, a wearable electronic device, a portable computer, a smart pad, a netbook, a light electronic vehicle (LEV), an electric car, a hybrid electric car, a plug-in hybrid electric car, and an electric power storage device.

Since the structures of these devices and the manufacturing method thereof are well known in the art, detailed description thereof will be omitted herein.

MODE FOR INVENTION

Figure 1:
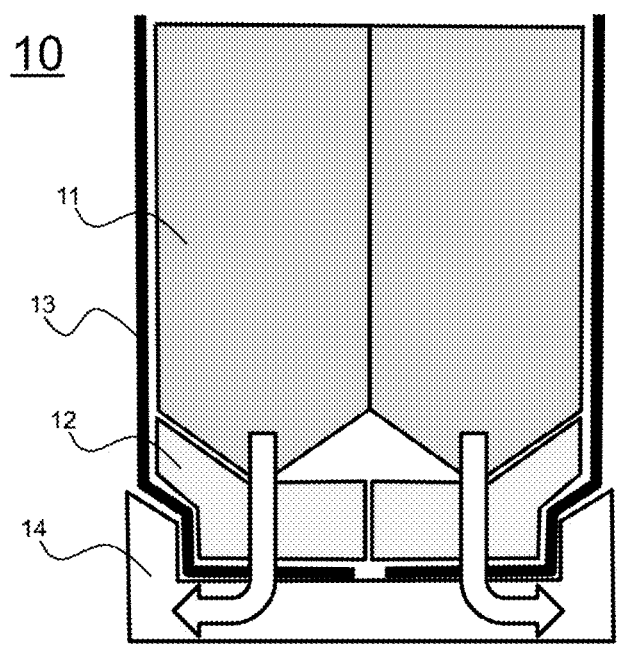
FIG. 1 is a vertical cross-sectional view partially representing the structure of a conventional battery module.

Hereinafter, the present invention will be described in detail, referring to the drawings according to an exemplary embodiment of the present invention, however, the scope of the present invention is not limited thereto.

Figure 2:
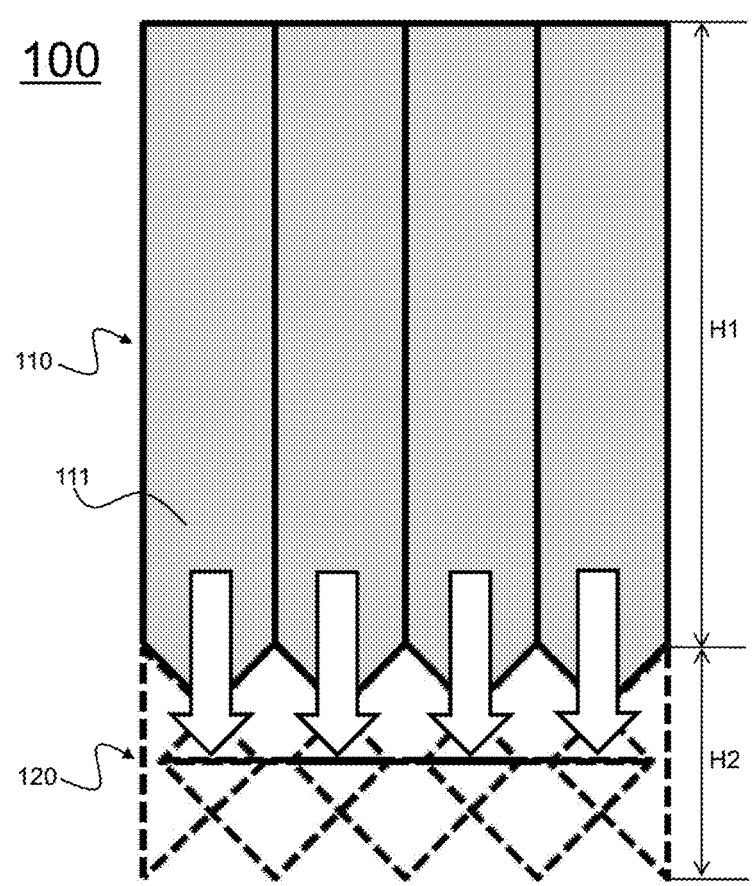
FIG. 2 is a vertical cross-sectional view partially representing the structure of a battery module according to an exemplary embodiment of the present invention.

FIG. 2 schematically illustrates a vertical cross-sectional view partially representing the structure of the battery module according to an exemplary embodiment of the present invention.

Referring to FIG. 2, the battery module 100 includes a battery cell laminate 110 and a cooling/buffering member 120.

The battery cell laminate 110 includes a plurality of pouch type battery cells 111 which are arranged with the sides being in contact with each other.

Beneath the battery cell laminate 110, the cooling/buffering member 120 formed of a porous structure, so as to support the load of the battery cell laminate 110 and emit heat generated from the battery cells 111 during the charge and discharge process in an arrow direction, is mounted.

The upper surface of the cooling/buffering member 120 is formed of a shape corresponding to the shape of the lower surface of the battery cell laminate 110, and specifically, the lower surface of the battery cell laminate 110 and the upper surface of the cooling/buffering member 120 are interlocked with each other thereby having a zigzag shape. The cooling/buffering member 120 is formed of a truss structure, so as to support the load of the battery cell laminate 110, attenuate external impact and vibrations, and form a space in which a coolant flows.

The cooling/buffering member 120 has a size (H2) which is 30% of the height (H1) of the battery cell laminate 110.

Figure 3:
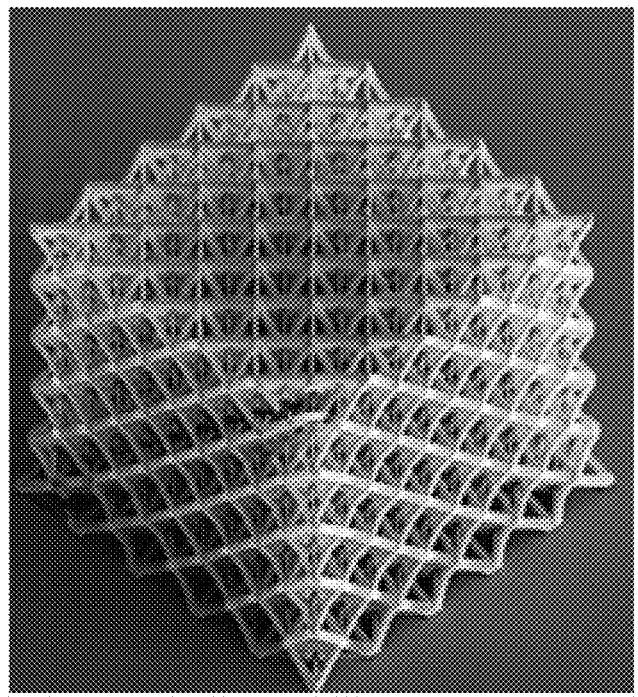
FIG. 3 is a perspective view of a cooling/buffering member according to another exemplary embodiment of the present invention.

FIG. 3 illustrates a perspective view of the cooling/buffering member according to another exemplary embodiment of the present invention.

Referring to FIG. 3 together with FIG. 2, the cooling/buffering member 220 is formed of a hexahedral structure corresponding to the lower surface of the battery cell laminate 110, and the hexahedral structure is formed by binding a plurality of square column structures.

The remaining structure except the shape of the cooling/buffering member 220 is identical to the exemplary embodiment shown in FIG. 2, and thus, the description thereof will be omitted.

Figure 4:
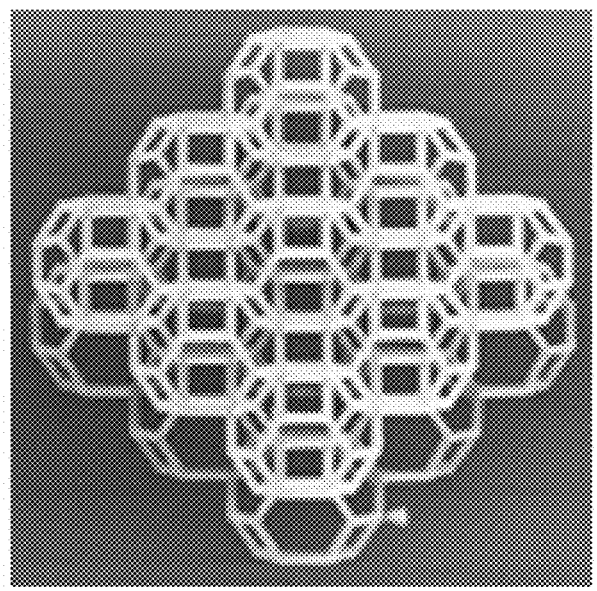
FIG. 4 is a perspective view of a cooling/buffering member according to another exemplary embodiment of the present invention.

FIG. 4 illustrates a perspective view of the cooling/buffering member according to another exemplary embodiment of the present invention.

Referring to FIG. 4 together with FIG. 2, the cooling/buffering member 320 is formed of a hexahedral structure corresponding to the lower surface of the battery cell laminate 110, and the hexahedral structure is formed by binding a plurality of polyhedrons.

The remaining structure except the shape of the cooling/buffering member 320 is identical to the exemplary embodiment shown in FIG. 2, and thus, the description thereof will be omitted.

Figure 5:
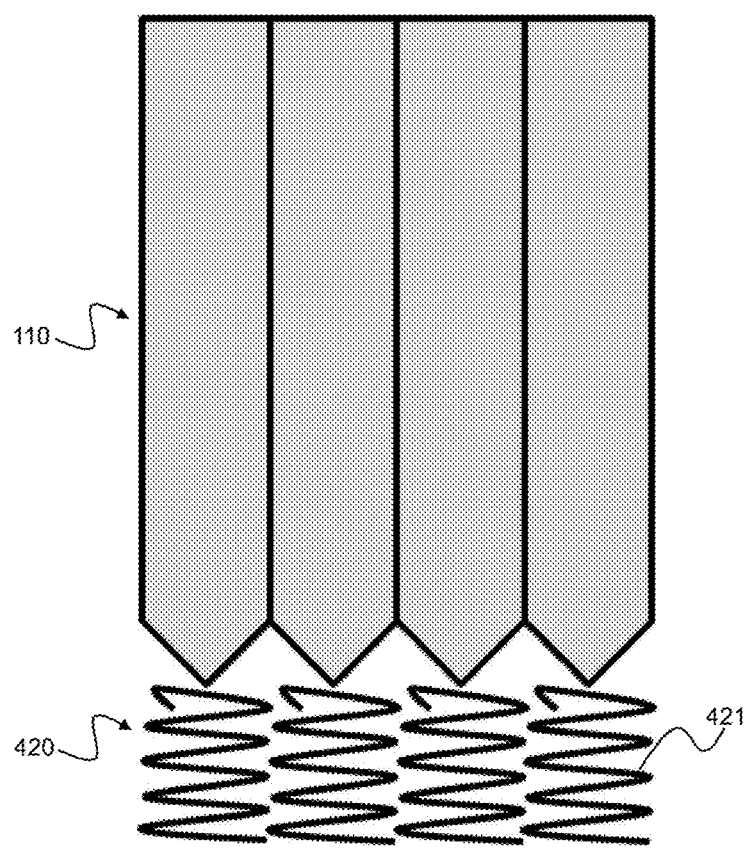
FIG. 5 is a perspective view of a cooling/buffering member according to another exemplary embodiment of the present invention.

FIG. 5 illustrates a perspective view of the cooling/buffering member according to another exemplary embodiment of the present invention.

Referring to FIG. 5, the cooling/buffering member 420 is formed of a structure in which a plurality of springs 421 are arranged and mounted on the lower surface of the battery cell laminate 110, regardless of the shape of the lower surface of the battery cell laminate 110.

The remaining structure except the shape of the cooling/buffering member 420 is identical to the exemplary embodiment shown in FIG. 2, and thus, the description thereof will be omitted.

Figure 6:
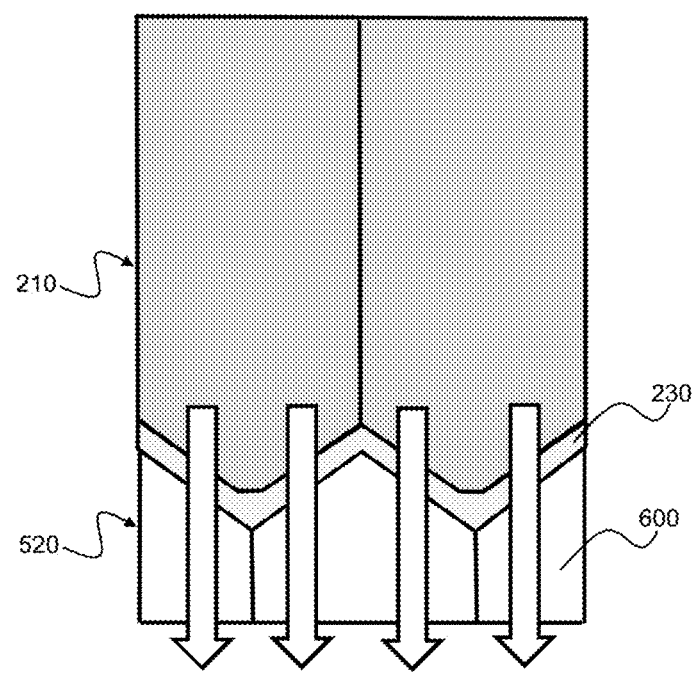
FIG. 6 is a vertical cross-sectional view partially representing the structure of a battery module according to another exemplary embodiment of the present invention.

FIG. 6 illustrates a vertical cross-sectional view partially representing the battery module according to another exemplary embodiment of the present invention.

Referring to FIG. 6, on the lower surface of the battery cell laminate 210, the cooling/buffering member 520 is bound to the battery cell laminate 210 by the adhesive member 230, and by the adhesive member 230, binding force between the battery cell laminate 210 and the cooling/buffering member 520 may be strengthened and thermal conductivity may be enhanced.

In order to further improve thermal conductivity from the battery cell laminate 210, the hollow region formed by the porous structure of the cooling/buffering member 520 is filled with a coolant 600 composed of a thermally conductive polymer which is then hardened.

Heat generated from the battery cell laminate 210 is emitted along an arrow direction.

A person with ordinary skill in the art to which the present invention pertains may perform various applications and modifications within the scope of the present invention, based on the above description.

INDUSTRIAL APPLICABILITY

As described above, the battery module according to the present invention has the cooling/buffering member having a porous structure mounted beneath the battery cell laminate so as to support the load of the battery cell laminate and emit heat generated from the battery cell laminate during the charge and discharge process down the battery cell laminate, thereby allowing a heat transfer path to be easily formed and changed, ensuring structural stability of the battery module, rendering the structure of the battery module compact as compared with the conventional battery module structure, and reducing manufacturing costs.

The invention claimed is:

1. A battery module comprising:
   a battery cell laminate in which a plurality of battery cells, each having a structure in which an electrode assembly is inside a sealed battery case with an electrolyte solution, are arranged with sides being in contact with each other; and
   a cooling/buffering member, mounted beneath the battery cell laminate to support a load of the battery cell laminate, and formed of a porous structure to emit heat generated from the battery cell laminate during a charge and discharge process down the battery cell laminate,
   wherein an upper surface of the cooling/buffering member has a shape corresponding to a shape of a lower surface of the battery cell laminate,
   wherein a plurality of hollow regions formed as openings in the porous structure of the cooling/buffering member is configured to be filled with a liquid or solid-phase coolant such that the coolant directly contacts the battery cell laminate,
   wherein the upper surface of the cooling/buffering member includes multiple different intersecting planes, each of the multiple different intersecting planes including one of the plurality of hollow regions,
   wherein the lower surface of the battery cell laminate corresponding to each of the battery cells also includes multiple different intersecting planes which respectively abut the multiple different intersecting planes of the upper surface of the cooling/buffering member,
   whereby the lower surface of the battery cell laminate corresponding to each of the battery cells directly contacts the coolant in a plurality of the hollow regions included in the respective multiple different intersecting planes.

2. The battery module of claim 1, wherein the cooling/buffering member is formed of a truss structure.

3. The battery module of claim 1, wherein the cooling/buffering member is formed of an elastic material to support the load of the battery cell laminate and attenuate external impact or vibrations applied to the battery cell laminate.

4. The battery module of claim 1, wherein the coolant is a polycarbonate-based resin.

5. The battery module of claim 1, wherein the coolant is a polyolefin-based resin.

6. The battery module of claim 3, wherein the elastic material is a polymer resin.

7. The battery module of claim 1, wherein:
   the plurality of hollow regions formed by the porous structure of the cooling/buffering member is filled with the solid-phase coolant; and
   the solid-phase coolant is a hardened thermally conductive polymer.

* * * * *